(12) United States Patent
Jaziri

(10) Patent No.: US 11,290,902 B2
(45) Date of Patent: Mar. 29, 2022

(54) METHOD AND SYSTEM FOR PERFORMING RADIO MEASUREMENTS IN A MOBILE NETWORK

(71) Applicant: Orange, Issy-les-Moulineaux (FR)

(72) Inventor: Aymen Jaziri, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/337,719

(22) PCT Filed: Sep. 28, 2017

(86) PCT No.: PCT/FR2017/052653
§ 371 (c)(1),
(2) Date: Mar. 28, 2019

(87) PCT Pub. No.: WO2018/060640
PCT Pub. Date: Apr. 5, 2018

(65) Prior Publication Data
US 2019/0246307 A1 Aug. 8, 2019

(30) Foreign Application Priority Data
Sep. 30, 2016 (FR) ...................................... 1659461

(51) Int. Cl.
*H04W 24/10* (2009.01)
*H04W 64/00* (2009.01)

(52) U.S. Cl.
CPC ........... *H04W 24/10* (2013.01); *H04W 64/00* (2013.01)

(58) Field of Classification Search
CPC . H04W 24/10; H04W 64/00; H04W 36/0009; H04W 36/0055; H04W 84/005; H04W 16/01
See application file for complete search history.

(56) References Cited

U.S. PATENT DOCUMENTS

| | | | |
|---|---|---|---|
| 2010/0202387 A1* | 8/2010 | Sawai | H04W 16/14 370/329 |
| 2015/0312788 A1* | 10/2015 | Delsol | H04W 84/047 370/252 |

(Continued)

FOREIGN PATENT DOCUMENTS

| | | |
|---|---|---|
| EP | 2217020 A2 | 8/2010 |
| WO | 2010056181 A1 | 5/2010 |
| WO | 2014063747 A1 | 5/2014 |

OTHER PUBLICATIONS

English translation of the Written Opinion dated Jan. 5, 2018 for International Application No. PCT/FR2017/052653 filed Sep. 28, 2017.

(Continued)

*Primary Examiner* — Awet Haile
(74) *Attorney, Agent, or Firm* — David D. Brush; Westman, Champlin & Koehler, P.A.

(57) ABSTRACT

A method of radio measurement in a mobile network, including the following acts: a base station of the mobile network transmits a radio measurement request message; the request message is received and taken into account by at least one mobile terminal, termed supra-mobile, situated in the zone of coverage of the base station; the supra-mobile broadcasts a signal recognizable by the mobile terminals situated in its neighborhood; at least one mobile terminal, termed a measurer terminal, subsequently to receiving the signal, responds to the supra-mobile by sending it at least one radio parameter relating to an ongoing or envisaged communication of the measurer terminal with the base station; the supra-mobile compiles the radio parameters received so as to obtain compilations of statistical radio parameters; and the supra-mobile activates its location if it is not already activated, and sends its position and the statistics to the base station.

16 Claims, 2 Drawing Sheets

(56) References Cited

U.S. PATENT DOCUMENTS

| | | | |
|---|---|---|---|
| 2016/0295453 A1* | 10/2016 | Minamiyama | H04H 20/38 |
| 2017/0359116 A1* | 12/2017 | Hwang | H04B 17/309 |
| 2018/0159616 A1* | 6/2018 | Aminaka | H04W 84/18 |
| 2018/0213379 A1* | 7/2018 | Xiong | H04W 40/22 |

OTHER PUBLICATIONS

International Search Report dated Jan. 5, 2018 for International Application No. PCT/FR2017/052653, filed Sep. 28, 2017.
Written Opinion of the International Searching Authority dated Jan. 5, 2018 for International Application No. PCT/FR2017/052653, filed Sep. 28, 2017.

* cited by examiner

METHOD AND SYSTEM FOR PERFORMING RADIO MEASUREMENTS IN A MOBILE NETWORK

CROSS-REFERENCE TO RELATED APPLICATIONS

This Application is a Section 371 National Stage Application of International Application No. PCT/FR2017/052653, filed Sep. 28, 2017, the content of which is incorporated herein by reference in its entirety, and published as WO 2018/060640 on Apr. 5, 2018, not in English.

FIELD OF THE DISCLOSURE

The present invention relates to radio measurements carried out in a cellular radiocommunication network (also called a mobile network). The invention is compatible with all the known radio access technologies (TDMA, CDMA, W-CDMA, OFDMA, and so on and so forth). It applies in particular to mobile networks using GSM (Global System for Mobile Communications) technology, such as defined in version 97 and the later versions of the GSM standard, or UMTS (Universal Mobile Telecommunications System) technology, such as defined in particular in standards 23.002, 23.003 and 29.060 of the 3GPP (Third-Generation Partnership Project) project, or the LTE (Long Term Evolution) standard, or else the HSPA (High Speed Packet Access) standard.

BACKGROUND OF THE DISCLOSURE

The management of the radio resources in a radiocommunication network relies in general on radio measurements which are performed in this network. Such management of radio resources may be more or less complex and require radio measurements of various types.

Operators must naturally take care to ensure sufficient communication throughput for all their subscribers. Accordingly, they must in particular rapidly identify the zones of a cell where the communications traffic is appreciably greater than the mean traffic in the cell (such a zone is customarily designated by the word "hotspot") because, for example, of a major event such as a temporary gathering, or of a natural catastrophe; indeed, the quality of the communications of subscribers situated in these congested zones is degraded. The identification of "hotspots" makes it possible to put in place offload means, such as for example sending a telecommunications relay to the site.

Operators also need to manage the interoperation between various radiocommunication networks, for example for the purposes of managing the mobility of a terminal from one network to another network. Such interoperation relies on radio resource management which may turn out to be complex and is effective only if it utilizes relevant radio measurements relating to the various networks considered.

Within the framework of these radio measurements, it has been envisaged for example to establish a map of interference which makes it possible to determine the level of interference at a given instant and at precise geographical locations. On the basis of such an interference level, it is thereafter possible to determine the actual use which is made of the frequency spectrum at a given instant and at precise geographical locations. Such a map of interference makes it possible to detect problems due to propagation in the network considered. It also makes it possible to detect that a network geographically neighboring the network considered uses the same frequency bands or adjacent frequency bands. Knowledge of the actual use of the frequency spectrum then makes it possible to optimize the use of the frequency spectrum in the network. For example, one thus knows the parts of this frequency spectrum which are not used at certain places and at a given instant by the terminals of a so-called primary network; terminals which may themselves belong to a secondary radiocommunication network different from this primary network can then be made to benefit therefrom, when it is considered that such use of the frequencies by the secondary network will not disturb the primary network.

Measurements of radio conditions in a network can be advantageously performed in this network by terminals belonging to users of the network (as opposed to terminals manipulated by the operational teams). Provision is thus made for the mobile terminals, belonging to a terrestrial mobile radio network such as a GSM network, or a UMTS network, or else an EDGE (Enhanced Data rates for GSM Evolution) network, to perform, in the network considered, measurements periodically or following predefined events.

Thus, the document entitled "MDT Measurement Model", proposed at the meeting #68bis of the 3GPP's RAN WG2 standardization group (Valencia, Spain, 18-22 Jan. 2010), describes a system for radio measurements in which a UTRAN (UMTS Terrestrial Radio Access Network) radio access network management entity broadcasts a message requesting the implementation, by users' mobile terminals, of a measurement of a specified nature in a specified geographical zone (this system is known as "Minimization of Drive Tests", or MDT). The terminals of the network receiving the request decide whether or not to perform the measurement requested, in particular, as a function of the fact that they are or are not situated in this measurement zone, something they can determine by means of a positioning device, such as a GPS (Global Positioning System) device, with which they are equipped; each terminal having performed the measurement is able to store the results of this measurement, and to transmit them to said UTRAN network at a predetermined instant.

A mobile terminal attached to a given network can also perform measurements on other networks geographically neighboring that to which it is attached, in particular with the aim of managing inter-network mobility. The mobile terminal then measures a power level or else estimates a level of quality in relation to the pilot channel for a certain number of base stations of the neighboring network, so as to choose one of them as potential target for possible inter-network mobility.

However, the MDT system exhibits the following drawbacks:
  the GPS localization is always used to collect these measurements; as the activation of the GPS consumes a great amount of energy at the level of the battery (indeed it entails a satellite communication), most of the mobiles do not activate their GPS module the whole time; the network must therefore locate such mobiles by means of a triangulation technique, which is not very precise and which requires significant calculational capabilities;
  the localization of traffic inside a building ("indoors") for example in commercial centers, cinema halls, concert halls, conferences, is not very precise because of the poor operation of GPS indoors;

the result of these measurements being transmitted by the terminals which performed them to the base stations of the network, this may result in a significant signaling load for the network; and a network entity establishes, on the basis of these measurements, a classification of the mobiles based on their positions as well as the type of traffic requested and the service quality required for the mobiles; but this classification work is considerable.

SUMMARY

The present invention therefore relates to a method of radio measurement in a mobile network, comprising the following steps:

a base station of said mobile network emits a radio measurement request message, said request message is received and taken into account by at least one mobile terminal, termed supra-mobile, situated in the zone of coverage of the base station, said supra-mobile broadcasts a signal recognizable by the mobile terminals situated in its neighborhood, at least one mobile terminal, termed a measuring terminal, following the reception of said signal emitted by the supra-mobile, responds to the supra-mobile by sending it at least one radio parameter relating to an ongoing or envisaged communication of said measuring terminal with the base station, the supra-mobile compiles the radio parameters received to obtain compilations of radio parameters, termed statistics, and the supra-mobile activates its localization if the latter is not already activated, and sends its position and said statistics to said base station.

Thus, the present invention proposes that the collection of radio parameters in a mobile network be carried out by way of particular mobile terminals, which will be called "supra-mobiles", each of these supra-mobiles being responsible for collecting radio parameters sent by mobile terminals close to the supra-mobile, for compiling these parameters to constitute what will be called "statistics", before sending these statistics to the base station to which the supra-mobile is attached.

The base station, or a network entity to which the base station transmits said statistics, can then compare the statistics of the various zones of the mobile network, for example in terms of radio conditions and of requested traffic, in conjunction with the localization of these zones.

By virtue of these arrangements, the mobile network can, in an inexpensive manner in terms of hardware and energy consumption, know the value of this or that radio parameter in the cell, and, in particular, precisely locate the congestion zones so as to be able to deal therewith effectively (in a manner known per se).

The invention exhibits numerous other advantages with respect to the prior art. Thus:

it requires, at the level of the base station or of said network entity, less processing and fewer calculations since a single mobile per zone of the network uploads its GPS coordinates with the information collected in its neighborhood;

it allows better traffic localization (provided that the position of the supra-mobile is uploaded without error); indeed, it is easier to compel a supra-mobile to activate its GPS (in addition to its Wi-Fi indoors) for a short duration than to compel all the terminals to do so (besides, in the MDT techniques, the mobiles are not compelled to activate their GPS);

the uploads of radio parameters cause less interference; and the number of exchanges between the terminals and the base station to which they are attached is reduced.

It will be noted moreover that:

the exchange of information between the supra-mobiles and the ordinary terminals can be performed by means of control messages which are made secure in a conventional manner; on the other hand, the radio parameters provided by the ordinary mobile terminals will preferably be processed by the supra-mobiles in an anonymous manner so as not to undermine the privacy of the users and not to disclose their movements, only the position of the supra-mobiles and said statistics being recorded and processed by the network; there is therefore no problem of confidentiality, and the implementation of the invention does not require any dedicated security measure; and the implementation of the invention does not impose any increase in energy consumption in the user mobiles; on the contrary, the upload of radio parameters from a mobile terminal to a supra-mobile, which is generally closer to the mobile terminal than is the base station, consumes less energy in this mobile terminal than the conventional upload of radio parameters directly to the base station.

This results in a noticeable improvement in the experience and satisfaction of the users of the mobile terminals implementing the invention.

According to particular characteristics, said base station chooses previously, in a dynamic manner, in at least one zone of predefined size, at least one subscriber mobile terminal to make thereof a supra-mobile.

Such arrangements naturally assume that the mobile terminals on the market are generally equipped with the means required to play the role of supra-mobiles.

By virtue of these arrangements, at any instant at which the mobile network needs to know the value of this or that radio parameter in a cell, the base station of this cell will be able to select, from among the mobile terminals situated in the cell and whose position is known, a set which is able to ensure an appropriate meshing of the cell.

It will be noted in this regard that, in the prior art, the use of agents embedded in mobile terminals in order to implement MDT techniques is not mentioned in the subscription contracts between the network operators and the users; it may therefore be envisaged that, likewise, the selection of a mobile terminal to play the role of supra-mobile might not be declared to the user of this mobile terminal.

According to other particular characteristics, said supra-mobile is a preselected mobile terminal.

By "preselected" is meant here that this mobile terminal has been tasked (generally by the network operator) with playing the role of supra-mobile for all said requests emitted by a base station.

By virtue of these arrangements, the base station is relieved of the task of selecting, from among the mobile terminals of subscribers situated in the cell, a certain number of mobile terminals to play the role of supra-mobiles.

Correlatively, according to a second aspect, the invention relates to a mobile terminal, termed supra-mobile. Said supra-mobile is noteworthy in that it comprises means for:

receiving and taking into account a radio measurement request message emitted by a base station of a mobile network to which it is attached, broadcasting a signal recognizable by the mobile terminals situated in its neighborhood, receiving, from at least one mobile terminal, termed a measuring terminal, that has or have received said signal, at least one radio parameter relating to an ongoing or envisaged communication of said measuring terminal with the base station, compiling the radio parameters received to obtain compilations of radio parameters, termed statistics, and activating its localization if the latter is not already activated, and sending its position and said statistics to said base station.

The advantages afforded by this supra-mobile are essentially the same as those afforded by the correlative methods set forth succinctly hereinabove.

It will be noted that it is possible to achieve this supra-mobile in the context of software instructions and/or in the context of electronic circuits.

This is why the invention also envisages a computer program downloadable from a communication network and/or stored on a medium readable by computer and/or executable by a microprocessor. This computer program is noteworthy in that it comprises instructions for the execution of the steps of the method of radio measurement set forth succinctly hereinabove, when it is executed on a computer.

According to a third aspect, the invention relates to a system for radio measurements in a mobile network, comprising:

at least one supra-mobile such as described succinctly hereinabove, at least one mobile terminal, termed a measuring terminal, comprising means for:
  receiving and taking into account said signal emitted by said supra-mobile,
  determining at least one radio parameter relating to an ongoing or envisaged communication of said measuring terminal with the base station, and
  sending said radio parameter to the supra-mobile, and at least one base station of said mobile network, comprising means for:
  emitting a radio measurement request message, and
  receiving from said supra-mobile, and taking into account, the position of the supra-mobile as well as said statistics.

The advantages afforded by this system are essentially the same as those afforded by the method of radio measurement set forth succinctly hereinabove.

Other aspects and advantages of the invention will become apparent on reading the description detailed hereinbelow of particular embodiments which are given by way of nonlimiting examples.

It is recalled firstly that diverse schemes for detecting hotspots are known.

For example, a first scheme, called "traffic projection" (cf. application EP 1168866), is based on metrics defined and stored at the level of the O&M ("Operation and Maintenance Center") entity of the network.

A second scheme (cf. A. Jaziri, R. Nasri et T. Chahed, "*Traffic Hotspot localization in 3G and 4G wireless networks using OMC metric*", in Proc. IEEE PIMRC, pages 270 to 274, September 2014) is based on the use of five performance indicators, namely the load, the throughputs of the cells and of the users, the neighboring level, the statistics of the distribution of the "Timing Advance" and of the angle of arrival, which are projected onto a network coverage map.

A third scheme is based mainly on probes and the analysis of traces. Despite its significant cost, this scheme is the one most widely used by operational teams. According to this scheme, localization is done for each user individually by utilizing the traces stored in servers with large memory capacities. The most widely used traces are: GPS data uploaded by the mobile, the proximity of a WiFi hotspot, the field level uploaded by the mobile and the cell identifier.

It is also possible to use other localization schemes such as triangulation (cf. A. Roxin et al., "*Survey of Wireless Geolocation Techniques*", in IEEE Globecom Workshops, 2007).

It will be noted in this regard that the present invention substantially facilitates the detection of hotspots.

DETAILED DESCRIPTION OF ILLUSTRATIVE EMBODIMENTS

An embodiment of the method of radio measurement according to the invention will now be described.

Figure 1:
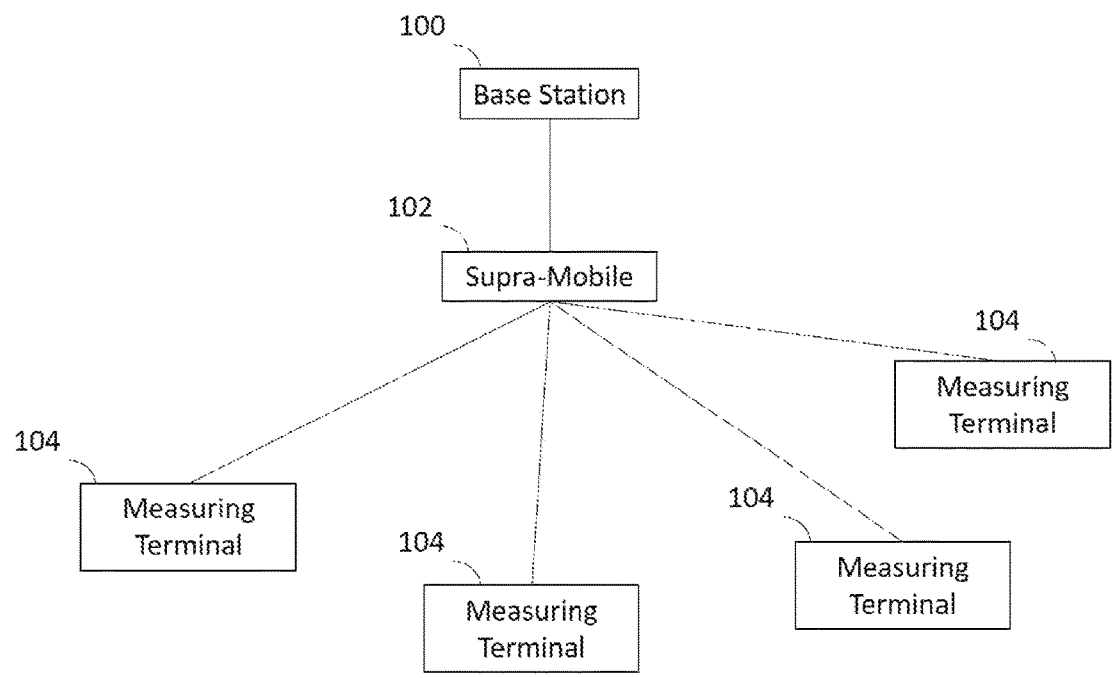
FIG. 1 is a block diagram showing a system for making radio measurements in a mobile network, according to an exemplary embodiment.
Figure 2:
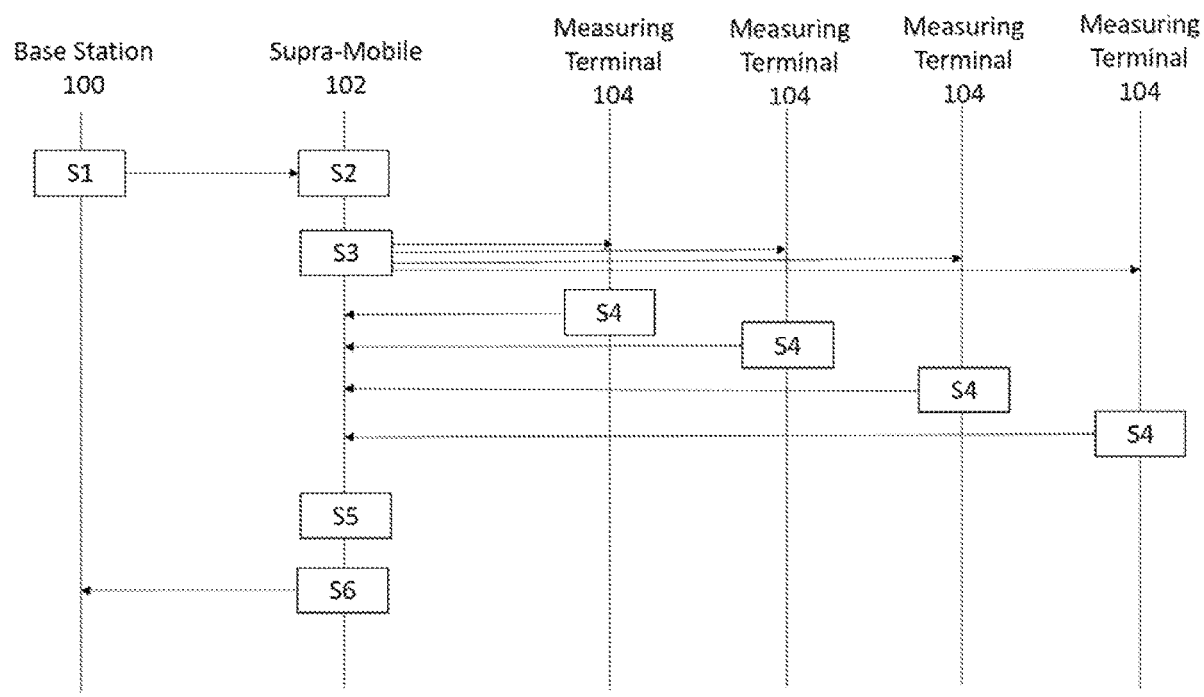
FIG. 2 is a signal diagram of a method for making radio measurements in a mobile network, according to an exemplary embodiment.

FIG. 1 is a block diagram showing a system for making radio measurements in a mobile network, and FIG. 2 is a signal diagram of a method for making the radio measurements, according to an exemplary embodiment.

According to a step S1, a base station 100 of a cellular network emits a request message on a control channel, for example the CBCH channel (the initials standing for "Cell Broadcast Channel") which is used for broadcasting specific information (road, weather information, and so on and so forth). The base station 100 may for example send such messages periodically, or when the load in the cell exceeds a certain threshold defining a congestion state in the cell, or on demand from a network entity.

According to a step S2, this request message is received and taken into account by the supra-mobiles 102 situated in the zone of coverage of the base station 100.

According to a step S3, each supra-mobile 102 broadcasts, on a dedicated control channel, for example in "device-to-device" (D2D) mode or by Bluetooth, a short-range signal recognizable by the mobile terminals situated in its neighborhood. This dedicated broadcast channel may for example be a sort of RACH (the initials standing for "Random-Access Channel"); it is recalled that an RACH is a shared channel used by the mobile terminals of TDMA, FDMA and CDMA networks in particular for the purposes of establishing communication setup.

According to a step S4, at least one mobile terminal, termed a measuring terminal 104, following the reception of a signal emitted by a supra-mobile 102, responds to this supra-mobile 102 on a dedicated channel by sending it at least one radio parameter relating to an ongoing or envisaged radio communication of said measuring terminal 104 with the base station 100. The measuring terminal 104 may for example:

send the supra-mobile 102 the result of measurements relating to an ongoing communication with the base station 100, such as the uplink Signal-to-Interference Ratio, or SIR, or the Power Headroom of the measuring terminal (UE Power Headroom, or UPH), or the Reference Signal Received Power (or RSRP), or else the Reference Signal Received Quality (or RSRQ), or indicate to the supra-mobile 102, by means of a signaling coded on a few bits, the amount of traffic that the measuring terminal 104 will need in a future communication with the base station 100, having regard to the service concerned (FTP, Voice, Video streaming, and so on and so forth).

Provision may be made for all the mobile terminals that have received the signal from a supra-mobile 102 to behave as measuring terminals, that is to say to respond to it by sending it at least one radio parameter. As a variant, provision may be made for only the mobile terminals desiring a throughput greater than a certain threshold to behave as measuring terminals; in this case, the mobile terminals which are inactive or which consume relatively little bandwidth do not respond to the signal emitted by the supra-mobile 102.

According to a step S5, each supra-mobile 102 compiles the radio parameters received to obtain what will be called "statistics", such as the number of active users per service, or the number of users situated in the zone of the surrounding cell, or else an average over the Signal-to-Interference Ratio for the users situated in this zone of the cell.

Finally, according to a step S6, each supra-mobile 102 activates its localization (GPS and/or WiFi) at least momentarily, if the latter is not already activated, and sends its position and its statistics to the base station 100. These statistics will be processed by the base station 100, or sent to a network entity responsible for performing this processing.

Figure 3:
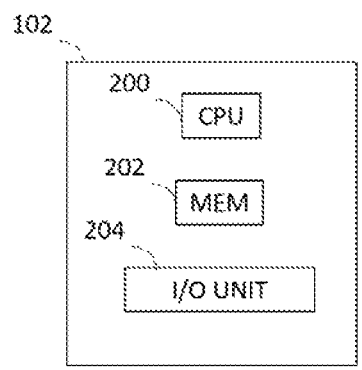
FIG. 3 is a block diagram of a supra-mobile terminal of the system shown in FIG. 1, according to an exemplary embodiment.

FIG. 3 is a block diagram of a supra-mobile terminal 102 of the system shown in FIG. 1, according to an exemplary embodiment.

The invention can be implemented within nodes of communication networks, for example mobile terminals and base stations of a cellular network, by means of software components and/or hardware components.

The software components will be able to be integrated into a conventional computer program for network node management. This is why, as indicated hereinabove, the present invention also relates to a computerized system, as shown in FIG. 3. This computerized system comprises in a conventional manner a central processing unit 200 controlling through signals a memory 202, as well as an input unit and an output unit 204. Moreover, this computerized system can be used to execute a computer program comprising instructions for the implementation of any one of the methods of radio measurement according to the invention.

Indeed, the invention also envisages a computer program downloadable from a communication network comprising instructions for the execution of the steps of a method of radio measurement according to the invention, when it is executed on a computer. This computer program can be stored on a medium readable by computer and can be executable by a microprocessor.

This program can use any programming language, and take the form of source code, object code, or of code intermediate between source code and object code, such as in a partially compiled form, or in any other desirable form.

The invention also envisages an irremovable, or partially or totally removable, information medium readable by a computer, and comprising instructions of a computer program such as mentioned hereinabove.

The information medium can be any entity or device capable of storing the program. For example, the medium can comprise a storage means, such as a ROM, for example a CD ROM or a microelectronic circuit ROM, or a magnetic recording means, such as a hard disk, or else a USB key ("USB flash drive" in English).

Moreover, the information medium can be a transmissible medium such as an electrical or optical signal, which can be conveyed via an electrical or optical cable, by radio or by other means. The computer program according to the invention can be in particular downloaded over a network of Internet type.

As a variant, the information medium can be an integrated circuit in which the program is incorporated, the circuit being adapted to execute or to be used in the execution of any one of the methods of radio measurement according to the invention.

Although the present disclosure has been described with reference to one or more examples, workers skilled in the art will recognize that changes may be made in form and detail without departing from the scope of the disclosure and/or the appended claims.

The invention claimed is:

1. A method comprising:
implementing the following acts in a mobile terminal, termed a supra-mobile:
upon receiving a radio measurement request message emitted by a base station of a mobile network, the supra-mobile being situated in a zone of coverage of the base station, broadcasting a signal recognizable by mobile terminals situated in the supra-mobile's neighborhood;
receiving, from a plurality of mobile terminals, termed measuring terminals, that have received said broadcast signal, at least one radio parameter relating to ongoing or envisaged communications of said measuring terminals with the base station;
compiling the radio parameters received from the plurality of measuring terminals to obtain compilations of radio parameters; and
activating the supra-mobile's localization if the localization is not already activated, and sending the supra-mobile's position and said compilations to said base station.

2. The method as claimed in claim 1, further comprising: the plurality of measuring terminals, following reception of said signal broadcast by the supra-mobile, responding to the supra-mobile by sending to the supra-mobile the at least one radio parameter relating to ongoing or envisaged communications of said measuring terminals with the base station.

3. The method as claimed in claim 1, wherein said base station chooses previously, in a dynamic manner, in at least one zone of a first size, at least one subscriber mobile terminal to make thereof said supra-mobile.

4. The method as claimed in claim 1, wherein said supra-mobile is a preselected mobile terminal.

5. The method of radio measurements as claimed in claim 2, wherein all the mobile terminals that have received said signal from said supra-mobile respond to said supra-mobile by sending to the supra-mobile at least one radio parameter.

6. The method of radio measurements as claimed in claim 2, wherein, from among the mobile terminals that have received said signal from said supra-mobile, only those desiring a throughput greater than a first value respond to said supra-mobile by sending to the supra-mobile at least one radio parameter.

7. The method of claim 1, comprising processing at least one of said compilations in an anonymous manner regarding the plurality of measuring terminals.

8. The method of claim 1, wherein all the mobile terminals that have received said signal from said supra-mobile respond to said supra-mobile by sending to the supra-mobile the at least one radio parameter.

9. The method of claim 1, wherein, from among the mobile terminals that have received said signal from said supra-mobile, only those desiring a throughput greater than a first value respond to said supra-mobile by sending to the supra-mobile the at least one radio parameter.

10. The method of claim 1 wherein said at least one radio parameter comprises at least one of:
   an uplink Signal-to-Interference Ratio;
   a Power Headroom of a measuring terminal;
   a Reference Signal Received Power (or RSRP);
   a Reference Signal Received Quality; or
   an amount of traffic that a measuring terminal will need in a future communication with the base station, having regard to a concerned service.

11. A mobile terminal, termed a supra-mobile, comprising:
   a processor; and
   a non-transitory computer-readable medium comprising instructions stored thereon, which when executed by the processor configure the supra-mobile to perform a method comprising:
   upon receiving a radio measurement request message emitted by a base station of a mobile network, the supra-mobile being situated in a zone of coverage of the base station, broadcasting a signal recognizable by mobile terminals situated in the supra-mobile's neighborhood;
   receiving, from a plurality of mobile terminals, termed measuring terminals, that have received said broadcast signal, at least one radio parameter relating to ongoing or envisaged communications of said measuring terminals with the base station;
   compiling the radio parameters received from the plurality of measuring terminals to obtain compilations of radio parameters; and
   activating the supra-mobile's localization if the localization is not already activated, and sending the supra-mobile's position and said compilations to said base station.

12. The mobile terminal of claim 11 wherein said at least one radio parameter comprises at least one of:
   an uplink Signal-to-Interference Ratio;
   a Power Headroom of a measuring terminal;
   a Reference Signal Received Power (or RSRP);
   a Reference Signal Received Quality; or
   an amount of traffic that a measuring terminal will need in a future communication with the base station, having regard to a concerned service.

13. The mobile terminal of claim 11 wherein said base station chooses previously, in a dynamic manner, in at least one zone of a first size, at least one subscriber mobile terminal to make thereof said supra-mobile.

14. The mobile terminal of claim 11 wherein said supra-mobile is a preselected mobile terminal.

15. The mobile terminal of claim 11 wherein all the mobile terminals that have received said signal from said supra-mobile respond to said supra-mobile by sending to the supra-mobile at least one radio parameter.

16. The mobile terminal of claim 11, wherein, from among the mobile terminals that have received said signal from said supra-mobile, only those desiring a throughput greater than a first value respond to said supra-mobile by sending to the supra-mobile at least one radio parameter.

\* \* \* \* \*